United States Patent [19]

Eguchi

[11] Patent Number: 4,547,414

[45] Date of Patent: Oct. 15, 1985

[54] ROOM TEMPERATURE SHRINKABLE COATING MATERIAL

[75] Inventor: Kanemitsu Eguchi, Aichi, Japan

[73] Assignee: Kitagawa Industries Co., Ltd., Nagoya, Japan

[21] Appl. No.: 528,444

[22] Filed: Sep. 1, 1983

[51] Int. Cl.$^4$ ............................................. B32B 27/04
[52] U.S. Cl. ....................................... 428/36; 156/86; 174/DIG. 8; 264/343
[58] Field of Search ..................... 428/36; 156/53, 86; 264/343; 174/DIG. 8

[56] References Cited

U.S. PATENT DOCUMENTS

| | | | |
|---|---|---|---|
| 4,070,746 | 1/1978 | Evans et al. | 174/DIG. 8 |
| 4,332,849 | 6/1982 | Barkus et al. | 174/DIG. 8 |
| 4,348,438 | 9/1982 | Canterino | 156/86 |
| 4,363,842 | 12/1982 | Nelson | 174/DIG. 8 |
| 4,419,322 | 12/1983 | Clemence et al. | 264/343 |

Primary Examiner—John E. Kittle
Assistant Examiner—James J. Seidleck
Attorney, Agent, or Firm—Oblon, Fisher, Spivak, McClelland, & Maier

[57] ABSTRACT

A room temperature shrinkable coating material is molded of a high-molecular material, and impregnated with a volatile swelling agent containing one or more of virtually unvolatile aids having a variety of properties inclusive of rustproofness. The aids remain on the surface, or in the inside, of the coating material from which the swelling agent has volatilized off, thereby affording their own properties to the coating material.

7 Claims, No Drawings

ROOM TEMPERATURE SHRINKABLE COATING MATERIAL

BACKGROUND OF THE INVENTION

(1) Field of the Invention

The present invention relates to a coating material shrinkable at room or normal temperature (hereinafter called the room temperature shrinkable coating material or simply the coating material). More specifically, this invention pertains to a coating material of the aforesaid type which is designed to be tightly coated over the surface portions of objects such as metallic articles, for example, the joints of metal piping and the connections of electric wiring or the grip of tools etc., and has a variety of effects such as, for instance, rustproofness, weather resistance, rodent resistance, dustproofness, stickiness, antistatic properties, adhesiveness, tinting, aging resistance, etc.

(2) Description of the Prior Art

Adhesive or insulating tapes have been applied over the joints of metal pipings or the connections of electrical wirings for the rustproofing, surface protecting (against externally mechanical damage) and insulating purposes; however, their appearance upon application as well as their durability and processability have been found to be inferior or unattractive. For that reason, heat shrinkable tubing has recently been proposed and put to practical use as an alternative. Such tubing is a tubular moldings formed of, e.g., high-molecular or polymeric materials such as polyethylene or polypropylene. The moldings are forcedly stretched under a temperature condition under which they deform thermally (hereinafter referred to as the thermal deformation temperature), cooled in a stretched state, and applied over the junctions of metal articles. Subsequently, the moldings are again heated to the thermal deformaion temperature with the use of heated air, steam or a flame to allow them to shrink, thereby being restored to their original shape prior to forced stretching, whereby they are tightly coated over the said junctions in conformity with the shape thereof.

Compared with the conventional taping, this coating method has several advantages in that the coated surface is smooth, no segregation of the coating takes place due to aging of adhesives, the finished appearance is attractive, the coating excels in durability, etc. Thus, this method is applied to a wide range from the connections and joints of electric wiring and metal piping to the covers of grip portions of tools.

However, this method is disadvantageous in that it cannot be applied in a place where the use of a heating flame is prohibited, strictly due to the necessity of reheating sources for affording the thermal deformation temperature. In addition, this method involves difficulty in affording the thermal deformation temperature to the connections of internal wiring in sophisticated devices such as electronic devices, since peripheral parts are adversely affected.

In view of such considerations, room temperature shrinkable tubing has been developed which dispense with any heating for affording the thermal deformation temperature, and are now superseding the heat shrinkable tubings.

The room temperature shinkable tubing is a tubular molding formed of elastic high-molecular or polymeric materials such as, polyvinyl chloride, silicone rubber, etc. The tubular moldings are immersed in ketones, esters, liquid hydrocarbons or other volatile swelling agents, and the thus swelled moldings are stored in sealed containers. When in use, the containers are unsealed to remove the swelled moldings from inside. The moldings are then applied over the surfaces of metals to be coated, for example, the connections of electric wirings, the joints of metal pipings or the grip parts of tools, and are allowed to stand at room temperature in order that the swelling agents may be volatized. Thereupon, the tubular moldings shrink in conformity with the shape of the articles to be coated, such as metal articles, as in the case of heat shrinkable tubing, whereby they are tightly coated thereover. The present coating system is advantageous in that any heating step is dispensed with. Further, it can be applied to the surfaces of thick and sectional metal articles, such as flange joints of metal piping, to which the heat shrinkable tubing can only be applied with difficulty. To this end, polymeric moldings bearing resemblance in shape to the surfaces they are applied to are prepared, immersed in volatile swelling agents and stored in sealed containers. As occasion arises, they are removed from the containers and applied over the subject surfaces.

With all shrinkable tubing system inclusive of the heating shrinkable coating system, the subject metal surfaces are hidden from sight. Hence, any visual detection of changes, e.g., corrosive changes, in the coated metal surfaces is unlikely, except where the coating breaks accidentally due to external forces. Conversely, entrainment of moisture of other rusting matters may take place depending upon the coating manner applied, with the result that there remains a potential for rusting. It is thus preferable that rust preventives or rust resisting paints be applied; however, this would lead to extra increases in the working steps involved and thus to the corresponding disadvantages.

SUMMARY OF THE INVENTION

As a result of intensive and extensive studies made to provide a solution to some problems arising in the use of the room temperature shrinkable coating materials, it has been found that, if the volatile swelling agents used to swell high-molecular coating materials are incorporated with a variety of virtually unvolatile aids having various properties, inclusive of rustproofness, desired for the coating materials, then the swelling agents may be volatized while only the virtually unvolatile aids remain on the surface, or on the inside, of the coating materials applied over the subject substrates, so that the aids can simultaneously produce a rustproofing effect and other desired effects.

According to the present invention, there is provided a room temperature shrinkable coating material designed to be tightly applied over the surface of an article, said coating material being molded of an elastic high-molecular material, impregnated with a volatile swelling agent containing one or more of virtually unvolatile aids having rustproofness and/or various properties desired in view of coating until said coating material swells, and stored in a sealed container, and, when in use, said coating material is removed from the unsealed container and applied over said surface in such a manner that it is tightly coated thereover due to restorative shrinkage caused by volatilization of said swelling agent, and that said aids remain on the surface, or on the inside, of said coating material to provide rustproofness and/or various properties thereof.

DESCRIPTION OF THE PREFERRED EMBODIMENT

Referring in detail to the present invention, the coating material is molded of a high-molecular or polymeric material, and impregnated with a volatile swelling agent until it swells. Examples of such a high-molecular material include polyvinyl chloride, silicone rubber, chloroprene, nitrile rubber, synthetic rubber such as EPDM, chlorosulfonated polyethylene, polyurethane, fluororubber, etc. The polymeric material is cast into a mold in conformity with the shape of the metals to be coated, for instance, in a heated and molten state to obtain a desired molding. Among others, polyvinyl chloride is of the greatest general-purpose. For example, preferable moldings are obtained from compositions comprising per 100 parts of poly vinyl chloride 30 to 60 parts of plasticizers for giving flexibility to that resin, such as dioctyl phthalate and dibutyl phthalate, stabilizers such as epoxylated soybean oil, lubricants such as stearates and other processing aids such as pigments by means of ordinary extrusion, contour extrusion, molding or injection molding.

Examples of the volatile swelling agent used in the present invention for the purpose of impregnating the polymeric material therewith for swelling include acetate base swelling agents such as ethyl acetate, n-propyl acetate, isopropyl acetate, n-butyl acetate, isobutyl acetate and amyl acetate, liquid hydrocarbons such as 2-nitropropane, trichlorotrifuluoroethane and trichloroethane as well as toluene, acetone, dioxane and the like. These swelling agents may be used alone or in the form of admixtures. Among others, the acetate base agents are applicable to a wide range of polymeric materials.

It is understood that some of the swelling agents have a high evaporation rate; other have a low evaporation rate. The higher the evaporation rate, the shorter the shrinking time of the coating material would be. However, it is preferred that a suitable combination of a swelling agent having a high evaporation rate with that having a low evaporation rate is applied in consideration of the working period required for coating of metals, the degree of swelling action upon the polymeric material and other like factors.

A first characteristic feature of the present invention is that aids are added to the volatile swelling agents used to swell the coating molding comprising the polymeric material, said aids having a variety of properties desired in view of coating such as rustproofness, weather resistance, rodent resistance, flame retard and, dustproofness, stickiness, antistatic properties, adhesiveness, tinting, aging resistance and the like, being virtually unvolatile at room temperature, and showing compatibility or uniform dispersibility with respect to both the swelling agents and the polymeric material.

In other words, when the invented coating material is applied over the surface of an object formed of, e.g., a metal, the volatile swelling agents contained therein volatilize off from the coating molding at room temperature, so that the molding shrinks and comes into tight contact with the said surface. On the other hand the virtually unvolatile aids do not volatilize and remain on the surface, or in the inside, of the coating molding. As a result, for instance, the rust preventive keeps the metal surface from rusting away, and other aids showing weather resistance, rodent resistance, flame retardancy dustproofness, stickiness, antistatic properties, adhesiveness, tinting, aging resistance, etc., produce their own effects upon the coating material.

The virtually unvolatile aids contained in the volatile swelling agents in the present invention may be such that they remain on the surface, or in the inside, of the shrunk coating material from which the volatile swelling agents have already volatilized off, thereby producing the desired effects such as, for instance, rustproofness, weather resistance, rodent resistance, dustproofness, flame retardancy, antistatic properties, stickiness and other properties, and show compatibility and uniform dispersibility with respect to both the coating material-forming polymeric material and the volatile swelling agents.

Table 1 shows the virtually unvolatile aids compatible to both the polymeric materials and the volatile swelling agents, the type of polymeric materials and the combination of volatile swelling agents as well as the properties thereof. The amounts of these components to be used may be determined depending upon the desired effects.

TABLE 1

| Properties | Virtually Unvolatile Aids | Polymeric Material | Volatile Swelling Agent |
|---|---|---|---|
| Rust-proofness | Sorbitan Esters | Polyvinyl Chloride | Ethyl Acetate |
| | Phosphates | Polyvinyl Chloride | Ethyl Acetate |
| | Ester Petroleum Sulfonates | Polyvinyl Chloride | Ethyl Acetate |
| | Fatty Acids | Silicone Rubber | Trichlorotrifluoroethane |
| | Metal Soaps | EPDM | Trichlorotrifluoroethane |
| | Fatty Acids | EPDM | 1.1.1.-trichloroethane |
| | Petroleum Sulfonates | EPDM | 1.1.1.-trichloroethane |
| | Metal Soaps | Silicone Rubber | 1.1.1.-trichloroethane |
| | Ester Petroleum Sulfonates | Polyvinyl Chloride | 1.1.1.-trichloroethane |
| | Sorbitan Esters | Polyvinyl Chloride | 1.1.1.-trichloroethane |
| | Phosphates | Chloroprene | 1.1.1.-trichloroethane |
| | Ester Petroleum Sulfonates | Chloroprene | 1.1.1.-trichloroethane |
| | Fatty Acids | Polyvinyl Chloride | Mixed Acetone and Toluene |
| | Petroleum Sulfonates | Polyvinyl Chloride | Mixed Acetone and Toluene |
| | Amines | Chlorosulfonated Polyethylene | Mixed Acetone and Toluene |
| | Metal Soaps | Chlorosulfonated Polyethylene | Mixed Acetone and Toluene |
| | Methyl Ester Petroleum Sulfonates | Chlorosulfonated Polyethylene | Mixed Acetone and Toluene |
| | Sorbitan Esters | Chlorosulfonated Polyethylene | Mixed Acetone and Toluene |
| | Phosphates | Chlorosulfonated Polyethylene | Mixed Acetone and Toluene |
| | Ester Petroleum Sulfonates | Chlorosulfonated Polyethylene | Mixed Acetone and Toluene |
| Weathering Resistance | Benzophenones | Polyvinyl Chloride | Ethyl Acetate |
| | Benzotriazoles | Polyvinyl Chloride | Ethyl Acetate |
| | Benzophenones | Silicone Rubber | Trichlorotrifluoroethane |
| | Benzophenones | EPDM | Trichlorotrifluoroethane |
| | Benzophenones | EPDM | 1.1.1.-trichloroethane |
| | Benzophenones | Silicone Rubber | 1.1.1.-trichloroethane |

TABLE 1-continued

| Properties | Virtually Unvolatile Aids | Polymeric Material | Volatile Swelling Agent |
|---|---|---|---|
| | Benzophenones | Polyvinyl Chloride | 1.1.1.-trichloroethane |
| | Benzophenones | Chloroprene | 1.1.1.-trichloroethane |
| | Benzophenones | Chlorosulfonated Polyethylene | 1.1.1.-trichloroethane |
| Rodent Resistance | Cyclohexamides | Polyvinyl Chloride | Ethyl Acetate |
| | β-naphtols | Polyvinyl Chloride | Ethyl Acetate |
| | Cycloheramides | EPDM | 1.1.1.-trichloroethane |
| | Cycloheramides | Silicone Rubber | 1.1.1.-trichloroethane |
| | Cycloheramides | Polyvinyl Chloride | 1.1.1.-trichloroethane |
| | Cycloheramides | Chloroprene | 1.1.1.-trichloroethane |
| | Cycloheramides | Chlorosulfonated Polyethylene | 1.1.1.-trichloroethane |
| Flame Retardancy | Halogen-containing Phosphates | Polyvinyl Chloride | Ethyl Acetate |
| | Phosphates | Polyvinyl Chloride | Ethyl Acetate |
| | Halogen-containing Phosphates | Silicone Rubber | Trichloro-trifluoroethane |
| | Halogen-containing Phosphates | EPDM | Trichloro-trifluoroethane |
| | Phosphates | Silicone Rubber | Trichloro-trifluoroethane |
| | Phosphates | EPDM | Trichloro-trifluoroethane |
| | Halogen-containing Phosphates | Silicone Rubber | 1.1.1.-trichloroethane |
| | Phosphates | Silicone Rubber | 1.1.1.-trichloroethane |
| | Halogen-containing Phosphates | EPDM | 1.1.1.-trichloroethane |
| | Phosphates | EPDM | 1.1.1.-trichloroethane |
| | Halogen-containing Phosphates | Polyvinyl Chloride | 1.1.1.-trifluoroethane |
| | Phosphates | Polyvinyl Chloride | 1.1.1.-trifluoroethane |
| | Halogen-containing Phosphates | Chloroprene | 1.1.1.-trifluoroethane |
| | Phosphates | Chloroprene | 1.1.1.-trifluoroethane |
| | Halogen-containing Phosphates | Chlorosulfonated Polyethylene | 1.1.1.-trifluoroethane |
| | Phosphates | Chlorosulfonated Polyethylene | 1.1.1.-trifuoroethane |

The room temperature shrinkable coating material according to the present invention may be prepared by selecting volatile swelling agents having a swelling action upon a polymeric material for forming a coating molding, adding to the swelling agents virtually unvolatile aids which show compatibility or uniform dispersibility thereto and exhibit compatibility to the polymeric material as well as the desired properties, and impregnating the coating molding with said agents and aids in a sealed container.

In this manner, the coating molding is swelled 1.1 to 10 times as large as the original volume prior to impregnation. The thus swelled coating molding is stored in a sealed bag together with a mixed liquid of the volatile swelling agents and the virtually unvolatile aids used for impregnation, said bag being a flexible polyethylene-nylon-polyethylene laminated bag which is lined with an aluminium foil to prevent attack by the said mixed liquid. The amount of the mixed liquid contained in the bag should then be chosen such that the inside thereof is saturated with a vapor of the volatile swelling agents.

As mentioned above, the present invention provides a room temperature shrinkable coating material formed of a polymeric material and swelled with swelling agents containing virtually unvolatile aids having a variety of properties desired in view of coating, inclusive of rustproofness. The invented coating material can be tightly coated over the joints of pipings, the connections of electric wirings and the grips of tools at room temperature without heating. Furthermore, rustproofness and other various properties such as weather resistance, dustproofness, flame retandancy, antistatic properties, tinting, aging resistance, adhesiveness and stickiness can simultaneously be afforded to the coating material depending upon the type of aids. Thus, the invented coating material is of great value.

What is claimed is:
1. A covering material capable of shrinking at room temperature onto the surface of a substrate to produce a tight sealing thereof, made of a high molecular weight polymer impregnated with a volatile swelling agent and at least one non-volatile agent selected from the group consisting of:
   rust-preventing agents,
   weathering agents,
   rodent repellents,
   flame retardants,
   dust-proofing agents,
   antistatic agents,
   adhesives,
   tinting agents and
   antiaging agents
wherein the non-volatile agent is soluble and homogeneously dispersible in the volatile swelling agent and in the polymer at room temperature.

2. The covering material of claim 1, wherein the polymer is selected from the group consisting of
   polyvinyl chloride,
   silicone rubber,
   chloroprene,
   nitrile rubber,
   EPDM,
   chlorosulfonated polyethylene,
   polyurethane and
   fluororubber.

3. The covering material of claim 1, wherein the volatile swelling agent is selected from the group consisting of
   acetate base swelling agents,
   liquid hydrocarbons, toluene,
   acetone, and
   dioxane.

4. The covering material of claim 3, wherein
   the acetate base swelling agents are selected from the group consisting of ethyl acetate, n-propyl acetate, isopropyl acetate, n-butyl acetate, isobutyl acetate and amyl acetate; and
   the liquid hydrocarbons are selected from the group consisting of 2-nitropropane, trichlorotrifluoroethane, and trichloroethane.

5. The covering material of claim 1 which is stored in an ethylene-nylon-polyethylene laminated bag in the presence of a mixed liquid of said swelling agent and said non-volatile agents used for impregnation, said bag lined with aluminum foil to prevent attack by said mixed liquid.

6. The covering material of claim 5, wherein the inside of said bag is saturated with a vapor of said mixed liquid.

7. The covering material of claim 1, which comprises:
(a) 100 parts of polyvinyl chloride,
(b) 30 to 60 parts of a plasticizer selected from the group consisting of dioctyl phthalate and dibutyl phthalate,
(c) a stabilizer selected from the group consisting of epoxylated soybean oil,
(d) a lubricant selected from the group consisting of stearates, and
(e) a pigment.

* * * * *